United States Patent
Yie et al.

(10) Patent No.: US 9,036,944 B2
(45) Date of Patent: May 19, 2015

(54) APPARATUS AND METHOD FOR ENCODING/DECODING IMAGES FOR INTRA-PREDICTION CODING

(75) Inventors: Chung Ku Yie, Incheon (KR); Min Sung Kim, Anyang-si (KR); Ul Ho Lee, Hwaseong-si (KR)

(73) Assignee: HUMAX HOLDINGS CO., LTD., Yongin-Si, Gyeonggi-Do (KR)

( * ) Notice: Subject to any disclaimer, the term of this patent is extended or adjusted under 35 U.S.C. 154(b) by 166 days.

(21) Appl. No.: 13/808,076

(22) PCT Filed: Jul. 4, 2011

(86) PCT No.: PCT/KR2011/004892
§ 371 (c)(1),
(2), (4) Date: Jan. 2, 2013

(87) PCT Pub. No.: WO2012/002785
PCT Pub. Date: Jan. 5, 2012

(65) Prior Publication Data
US 2013/0108182 A1 May 2, 2013

(30) Foreign Application Priority Data

Jul. 2, 2010 (KR) .................... 10-2010-0064009

(51) Int. Cl.
*G06K 9/03* (2006.01)
*G06T 9/00* (2006.01)
(Continued)

(52) U.S. Cl.
CPC .............. *G06T 9/004* (2013.01); *H04N 19/176* (2014.11); *H04N 19/119* (2014.11); *H04N 19/46* (2014.11);
(Continued)

(58) Field of Classification Search
None
See application file for complete search history.

(56) References Cited

U.S. PATENT DOCUMENTS 7,492,950 B2 * 2/2009 Suzuki et al. ................. 382/232
2006/0133693 A1 * 6/2006 Hunt .............................. 382/293
(Continued)

FOREIGN PATENT DOCUMENTS

KR 10-2008-0088039 A 10/2008
KR 10-2008-0107965 A 12/2008
(Continued)

OTHER PUBLICATIONS

Thomas Davies et al., Suggestion for a Test Model, Joint Collaborative Team on Video Coding (JCT-VC) of ITU-T SG16 WP3 and ISO/IEC JTC1/SC29/WG11, 1st Meeting: Dresden, DE, Apr. 15-23, 2010.

(Continued)

*Primary Examiner* — Chan Park
*Assistant Examiner* — Eueng-Nan Yeh
(74) *Attorney, Agent, or Firm* — Lowe Hauptman & Ham, LLP

(57) ABSTRACT

A method of decoding an image includes the steps of restoring a residual value by performing inverse quantization and inverse transform on the residual value by entropy decoding a received bit stream, generating a prediction unit by performing intra prediction selectively using one of a plurality of prediction modes on a prediction unit split by conducting at least one of asymmetric partitioning and geometrical partitioning, and restoring an image by adding the residual value to the prediction unit. It may be possible to enhance encoding efficiency of high-resolution images having a resolution of HD or higher by performing intra prediction on the asymmetric partitioning and/or geometrical partitioning.

6 Claims, 16 Drawing Sheets

(51) Int. Cl.
*H04N 19/176* (2014.01)
*H04N 19/119* (2014.01)
*H04N 19/46* (2014.01)
*H04N 19/593* (2014.01)
*H04N 19/11* (2014.01)
*H04N 19/14* (2014.01)
*H04N 19/107* (2014.01)
*H04N 19/91* (2014.01)
*H04N 19/44* (2014.01)
*H04N 19/523* (2014.01)
*H04N 19/547* (2014.01)

(52) U.S. Cl.
CPC ............. *H04N 19/593* (2014.11); *H04N 19/11* (2014.11); *H04N 19/14* (2014.11); *H04N 19/00042* (2013.01); *H04N 19/00072* (2013.01); *H04N 19/00157* (2013.01); *H04N 19/00545* (2013.01); *H04N 19/107* (2014.11); *H04N 19/91* (2014.11); *H04N 19/44* (2014.11); *H04N 19/523* (2014.11); *H04N 19/547* (2014.11)

(56) References Cited

U.S. PATENT DOCUMENTS

| | | | |
|---|---|---|---|
| 2006/0153297 A1* | 7/2006 | Boyce | 375/240.16 |
| 2007/0047651 A1* | 3/2007 | Kim et al. | 375/240.16 |
| 2008/0240246 A1 | 10/2008 | Lee et al. | |
| 2008/0304569 A1 | 12/2008 | Lee et al. | |
| 2009/0268810 A1 | 10/2009 | Dai | |
| 2010/0061454 A1 | 3/2010 | Park et al. | |

FOREIGN PATENT DOCUMENTS

KR  10-2010-0020441 A  2/2010
WO  2009051719 A2  4/2009

OTHER PUBLICATIONS

Search Report of EP Application 11 80 1190.7 dated Jun. 27, 2014.
Ken McCann et al., Samsung's Response to the Call for Proposals on Video Compression Technology, Joint Collaborative Team on Video Coding (JCT-VC) of ITU-T SG16 WP3 and ISO/IEC JTC1/SC29/WG11, 1st Meeting: Dresden, DE, Apr. 15-23, 2010.

* cited by examiner

16X4

Prediction mode 0

Prediction mode 1
Average value

Prediction mode 2

Prediction mode 3

Prediction mode 4

APPARATUS AND METHOD FOR ENCODING/DECODING IMAGES FOR INTRA-PREDICTION CODING

This application is the National Phase of PCT/KR2011/004892 filed on Jul. 4, 2011, which claims priority under 35 U.S.C. 119(a) to Korean Patent Application No. 10-2010-0064009 filed on Jul. 2, 2010 in the Korean Intellectual Property Office (KIPO), all of which are hereby expressly incorporated by reference into the present application.

BACKGROUND

1. Technical Field

The present invention is directed to encoding and decoding images, and more specifically to an apparatuses and methods for encoding/decoding images that may be applied to intra prediction.

2. Description of the Related Art

In general image compression methods, one picture is separated into multiple blocks each having a predetermined size. Inter-prediction and intra-prediction technologies are used to remove redundancy between pictures so as to increase compression efficiency.

The method of encoding images using intra prediction predicts pixel values based on pixel correlation between blocks from pixel values in the blocks surrounding a current block, which have been already encoded, such as an upper block, a left block, an upper and left block, and an upper and right block in a current frame (or picture), and transmits their prediction errors.

In the intra-prediction encoding, among several prediction directions (horizontal, vertical, diagonal, or average, etc.), an optimal prediction mode (prediction direction) is selected to be suited for characteristics of an image to be encoded.

In the existing H.264/AVC standards, in the case that the intra-prediction encoding applies to a 4×4 pixel unit block, among nine prediction modes (prediction modes 0 to 8), one most appropriate prediction mode is selected every 4×4 pixel blocks, and the selected prediction mode (prediction direction) is encoded on a per-4×4 pixel block basis. Further, in the case that the intra-prediction encoding applies to a 16×16 pixel unit block, among four prediction modes (vertical prediction, horizontal prediction, average prediction, and planar prediction), one most appropriate prediction mode is selected every 16×16 pixel blocks, and the selected prediction mode (prediction direction) is encoded on a per-16×16 pixel block basis.

In the existing intra-prediction encoding, a predetermined number of prediction directions are predefined only for M×M square-type symmetrical pixel blocks (M=4, 8, or 16) to perform the intra-prediction encoding. That is, conventionally, M×M-size symmetrical partitioning only is applied for intra-prediction encoding so that a square-type symmetrical block is used as a basic unit for the intra-prediction encoding.

SUMMARY

It is required a method of increasing coding efficiency because there are limits for increasing coding efficiency when intra prediction is performed using only the conventional symmetric pixel blocks.

Especially, it is required a method of increasing coding efficiency because there are limits for increasing coding efficiency when intra prediction is performed on high-resolution image having a resolution of an HD (High Definition) or higher using only symmetric pixel blocks.

A first object of the present invention is to provide an intra prediction encoding method and apparatus that may be applicable to a high-resolution image having a resolution of an HD (High Definition) or higher.

A second object of the present invention is to provide an intra prediction decoding method and apparatus that may be applicable to a high-resolution image having a HD (High Definition) or higher.

To achieve the above-described first object of the present invention, according to an aspect of the present invention, a method of encoding an image includes the steps of performing intra-prediction encoding by selectively using one of a plurality of prediction modes on a prediction unit which is split by applying at least one of asymmetric partitioning and geometrical partitioning to an input image so as to prediction-encode the input image and performing transform, quantization, and entropy encoding on a residue which is a difference between a prediction unit predicted by the intra prediction and a current prediction unit. A pixel value in the asymmetrically partitioned prediction unit may be predicted by using a pixel value in a block encoded earlier than the prediction unit along one of a vertical direction, a horizontal direction, an average value prediction, a diagonal down-right direction, and a diagonal down-left direction.

To achieve the above-described second object of the present invention, according to an aspect of the present invention, a method of decoding an image includes the steps of restoring a residue by entropy-decoding a received bit stream and by performing inverse quantization and inverse transform on the residue, generating a prediction unit by performing intra-prediction encoding that selectively uses one of a plurality of prediction modes on a prediction unit which is split by applying at least one of asymmetric partitioning and geometrical partitioning, and restoring the image by adding the residue to the prediction.

A pixel value in the asymmetrically partitioned prediction unit may be predicted by using a pixel value in a block encoded earlier than the prediction unit along one of a vertical direction, a horizontal direction, an average value prediction, a diagonal down-right direction, and a diagonal down-left direction. The pixel value in the asymmetrically partitioned prediction unit may be predicted by using the pixel value in the block encoded earlier than the prediction unit along lines formed at the same predetermined angle all over the entire direction within 360°. The pixel value in the asymmetrically partitioned prediction unit may be subjected to intra prediction along a line with an angle corresponding to a slope with dx along the horizontal direction and dy along the vertical direction based on information on dx and dy defining the slope. A predicted pixel value of a pixel positioned at a rightmost and lowermost end of the prediction unit may be obtained using vertically and/or horizontally directional corresponding pixel values in left side block and upper end block encoded earlier than the prediction unit. The pixel value of the pixel positioned at the rightmost and lowermost end of the prediction unit may be obtained by performing linear interpolation using vertically and/or horizontally directional corresponding pixel values in the left side block and upper end block encoded earlier than the prediction unit and vertically and/or horizontally directional corresponding internal pixel value in the prediction unit. A predicted pixel value of a pixel positioned at a rightmost and lowermost end of a current prediction unit of an Nth picture may be obtained by obtaining an average value or performing linear interpolation using vertically and/or horizontally directional pixel values in previously encoded left side block and upper end block which are positioned adjacent to the current prediction unit and vertically and/or horizontally directional corresponding pixel values in the previously encoded left side block and upper end block positioned adjacent to a corresponding prediction unit of an N−1th picture.

To achieve the above-described second object of the present invention, according to another aspect of the present invention, an apparatus for decoding an image includes an inverse-transform unit configured to reconstruct a residue by entropy-decoding a received bit stream and by performing inverse quantization and inverse transform on the residue, an intra predicting unit configured to generate a prediction unit by performing intra-prediction encoding that selectively uses one of a plurality of prediction modes on a prediction unit which is split by applying at least one of asymmetric partitioning and geometrical partitioning, and an adder configured to reconstruct the image by adding the residue to the prediction.

According to the above-described intra-prediction encoding/decoding methods and apparatuses, the intra-prediction encoding/decoding methods and apparatuses can enhance encoding efficiency for high-resolution images having an HD or ultra HD resolution by applying intra-prediction encoding/decoding to pixels blocks having an asymmetrical shape or any geometrical shape with a size of M×N.

DESCRIPTION OF EXAMPLE EMBODIMENTS OF THE PRESENT INVENTION

Figure 1:
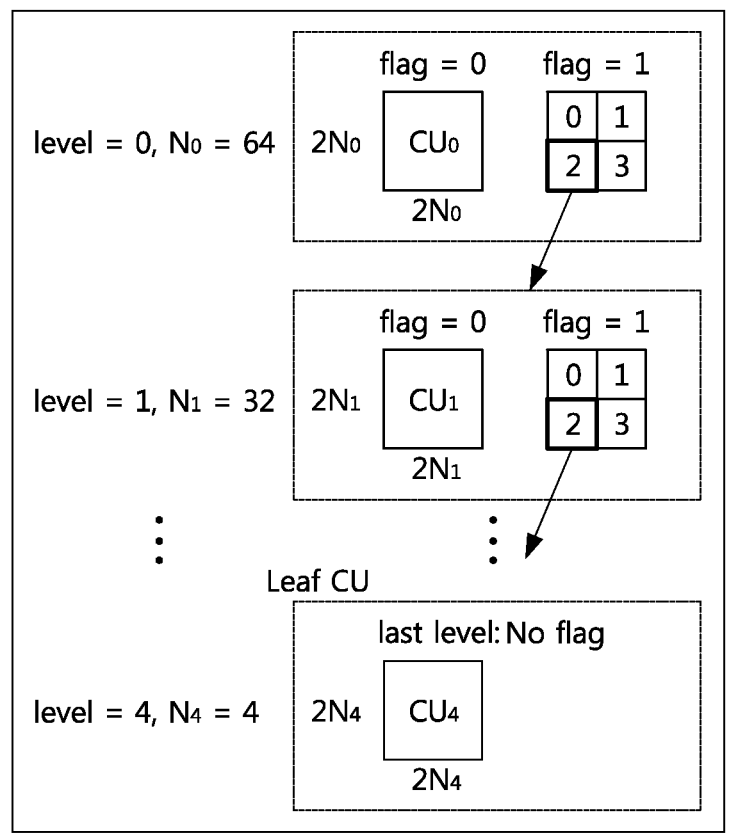
FIG. 1 is a conceptual view illustrating a recursive coding unit structure according to one example embodiment of the present invention.

Various modifications may be made to the present invention and the present invention may have a number of embodiments. Specific embodiments are described in detail with reference to the drawings.

However, the present invention is not limited to specific embodiments, and it should be understood that the present invention includes all modifications, equivalents, or replacements that are included in the spirit and technical scope of the present invention.

The terms "first" and "second" may be used to describe various components, but the components are not limited thereto. These terms are used only to distinguish one component from another. For example, the first component may be also named the second component, and the second component may be similarly named the first component. The term "and/or" includes a combination of a plurality of related items as described herein or any one of the plurality of related items.

When a component is "connected" or "coupled" to another component, the component may be directly connected or coupled to the other component. In contrast, when a component is directly connected or coupled to another component, no component intervenes.

The terms used herein are given to describe the embodiments but not intended to limit the present invention. A singular term includes a plural term unless otherwise stated. As used herein, the terms "include" or "have" are used to indicate that there are features, numerals, steps, operations, components, parts or combinations thereof as described herein, but do not exclude the presence or possibility of addition of one or more features, numerals, steps, operations, components, parts or components thereof.

Unless defined otherwise, all the terms used herein including technical or scientific terminology have the same meaning as are generally understood by those skilled in the art. Such terms as defined in the dictionary as commonly used should be construed to have the same meanings as those understood in the context of the related technology, and unless otherwise defined, should not be understood ideally or too formally.

Hereinafter, preferred embodiments of the present invention will be described in greater detail with reference to the accompanying drawings. For ease of description, the same reference numerals are used to denote the same components throughout the specification and the drawings, and the description thereof is not repeated.

According to an example embodiment of the present invention, encoding and decoding including inter/intra prediction, transform, quantization, and entropy encoding may be performed using an extended macroblock size of 32×32 pixels or more to be applicable to high-resolution images having a resolution of HD (High Definition) or higher, and encoding and decoding may be conducted using a recursive coding unit (CU) structure that will be described below.

FIG. 1 is a conceptual view illustrating a recursive coding unit structure according to an example embodiment of the present invention.

Referring to FIG. 1, each coding unit CU has a square shape and may have a variable size of 2N×2N (unit: pixels). Inter prediction, intra prediction, transform, quantization, and entropy encoding may be performed on a per-coding unit basis. The coding unit CU may include a maximum coding unit LCU and a minimum coding unit SCU. The size of the maximum or minimum coding unit LCU or SCU may be represented by powers of 2 which are 8 or more.

Figure 4:
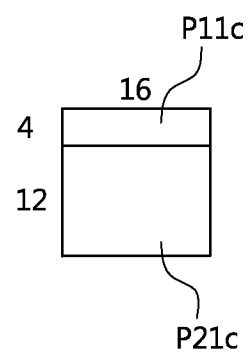

According to an example embodiment, the coding unit CU may have a recursive tree structure. FIG. 1 illustrates an example where a side of the maximum coding unit LCU (or CU0) has a size of 2N0 which is 128 (N0=64) while the maximum level or level depth is 5. The recursive structure may be represented by a series of flags. For example, in the case that a coding unit CUk whose level or level depth is k has a flag value of 0, coding on the coding unit CUk is performed on the current level or level depth. When the flag value is 1, the coding unit CUk is split into four independent coding units CUk+1 having a level or level depth of k+1 and a size of Nk+1×Nk+1. In this case, the coding unit CUk+1 may be recursively processed until its level or level depth reaches the permissible maximum level or level depth. When the level or level depth of the coding unit CUk+1 is the same as the permissible maximum level or level depth (which is, e.g., 4 as shown in FIG. 4), any further splitting is not permissible.

The size of the maximum coding unit LCU and the size of the minimum coding unit SCU may be included in a sequence parameter set (SPS). The sequence parameter set SPS may include the permissible maximum level or level depth of the maximum coding unit LCU. For example, in the example illustrated in FIG. 2, the permissible maximum level or level depth is 5, and when the side of the maximum coding unit LCU has a size of 128 pixels, five coding unit sizes, such as 128×128 (LCU), 64×64, 32×32, 16×16, and 8×8 (SCU), may be possible. That is, given the size of the maximum coding unit LCU and the permissible maximum level or level depth, the permissible size of the coding unit may be determined.

Use of the above-described recursive coding unit structure may provide the following advantages.

First, a size larger than that of the existing 16×16 macro-block may be supported. If an image region of interest is homogeneous, the maximum coding unit LCU may express the image region of interest with a smaller number of symbols than when using a number of small blocks.

Second, compared to when using a fixed size of macro-block, any size of maximum coding unit LCU may be supported, so that the codec may be easily optimized to various contents, applications, and apparatuses. That is, the size of the maximum coding unit LCU, the maximum level or level depth may be properly selected so that the hierarchical block structure may be optimized further than the target application.

Third, irrespective of whether it is a macro-block, sub-macro-block, or extended macro-block, a single unit type of a coding unit LCU is used so that the multilevel hierarchical structure may be simply represented by using the size of the maximum coding unit LCU, the maximum level (or the maximum level depth), and a series of flags. When used together with size-independent syntax representation, the coding unit LCU is enough to indicate one generalized size of syntax item for the remaining coding tools, and such conformity may simplify actual parsing processes. The maximum level value (or maximum level depth value) may be any value and may have a value larger than a value permitted in the existing H.264/AVC encoding scheme. All syntax elements may be indicated in a consistent manner independent from the size of the coding unit CU by using the size-independent syntax representation. The splitting process for the coding unit may be recursively indicated, and syntax elements for the leaf coding unit (the last coding unit in the level) may be defined to the same size regardless of the size of the coding unit. The above representation is very effective in reducing parsing complexity and may make the representation further clarified when a high level or level depth is allowed.

If the hierarchical splitting process is complete, inter prediction or intra prediction may be performed on the leaf node of the coding unit hierarchical unit without being further split. This leaf coding unit is used as the prediction unit PU which is a basic unit of the inter prediction or intra prediction.

For inter prediction or intra prediction, partitioning is fulfilled on the leaf coding unit. That is, partitioning is performed on the prediction unit PU. Here, the prediction unit PU is a basic unit for inter prediction or intra prediction and may be an existing macro-block unit or sub-macro-block unit, or an extended macro-block unit having a size of 32×32 pixels or more or a coding unit.

All information related to prediction (motion vector, difference between motion vectors, etc) is transmitted to decoder in a unit of prediction unit which is a basic unit of inter-prediction.

For inter prediction or intra prediction partitioning may include asymmetrical partitioning, geometrical partitioning in any shape other than square, or partitioning along an edge direction, which are now described in greater detail.

FIGS. 2 to 5 are conceptual views illustrating asymmetric partitioning according to an embodiment.

Figure 3:
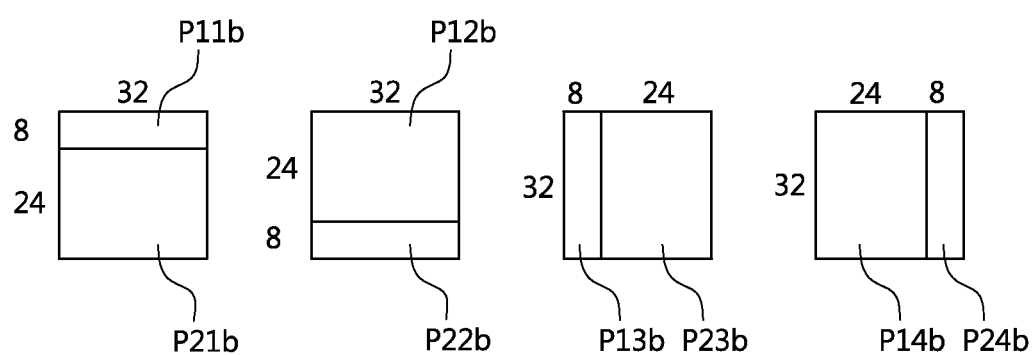
Figure 5:
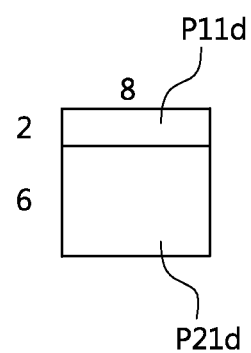

When the prediction unit PU for inter prediction or intra prediction has a size of M×M (M is a natural number. The unit of the size is pixel), asymmetric partitioning is performed along a horizontal or vertical direction of the coding unit. FIGS. 3 to 5 illustrate examples where the size of the prediction unit PU is 64×64, 32×32, 16×16, 8×8 pixels. FIGS. 3 and 4 illustrate asymmetric partition where the size of the prediction unit PU is more than 16×16 pixels which is the size of macroblock.

Figure 2:
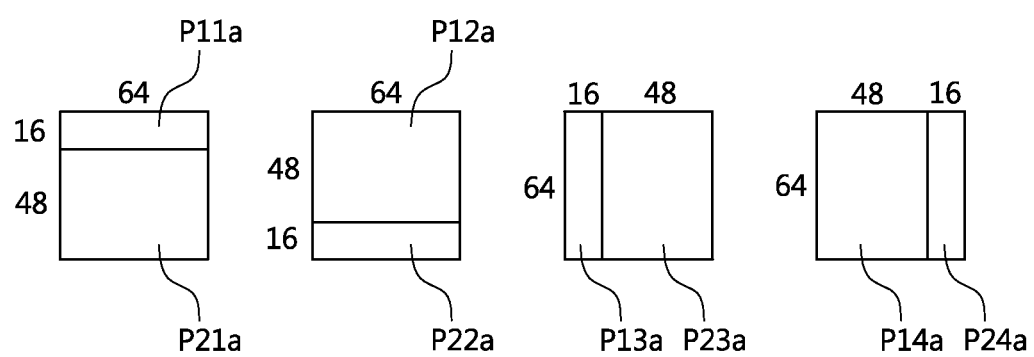
FIGS. 2 to 5 are conceptual views illustrating an asymmetric partitioning method according to one example embodiment of the present invention.

Referring to FIG. 2, in the case of having a size of 64×64, asymmetric partitioning is conducted along a horizontal direction to split the prediction unit into a partition P11a having a size of 64×16 and a partition P21a having a size of 64×48 or into a partition P12a having a size of 64×48 and a partition P22a having a size of 64×16. Or, asymmetric partitioning is performed along a vertical direction to split the prediction unit into a partition P13a having a size of 16×64 and a partition P23a having 48×64 or into a partition P14a having a size of 48×64 and a partition P24a having a size of 16×64.

Referring to FIG. 3, in the case of having a size of 32×32, the prediction unit may be subjected to horizontal-direction asymmetric partitioning to be split into a partition P11b having a size of 32×8 and a partition P21b having a size of 32×24 or into a partition P12b having a size of 32×24 and a partition P22b having a size of 32×8. Or, the prediction unit may be subjected to vertical-direction asymmetric partitioning to be split into a partition P13b having a size of 8×32 and a partition P23b having a size of 24×32 or into a partition P14b having a size of 24×32 and a partition P24b having a size of 8×32.

Referring to FIG. 4, in the case of having a size of 16×16, the prediction unit PU may be subjected to horizontal-direction asymmetric partitioning to be split into a partition P11c having a size of 16×4 and a partition P21c having a size of 16×12 or (although not shown in the drawings) into an upper partition having a size 16×12 and a lower partition having a size of 16×4. Further, although not shown in the drawings, the prediction unit PU may be subjected to vertical-direction asymmetric partitioning to be split into a left partition having a size of 4×16 and a right partition having a size of 12×16 or into a left partition having a size of 12×16 and a right partition having a size of 4×16.

Referring to FIG. 5, in the case of having a size of 8×8, the prediction unit PU may be subjected to horizontal-direction asymmetric partitioning to be split into a partition P11d having a size of 8×2 and a partition P21d having a size of 8×6 or (although not shown in the drawings) into an upper partition having a size 8×6 and a lower partition having a size of 8×2. Further, although not shown in the drawings, the prediction unit PU may be subjected to vertical-direction asymmetric partitioning to be split into a left partition having a size of 2×8 and a right partition having a size of 6×8 or into a left partition having a size of 6×8 and a right partition having a size of 2×8.

Figure 6:
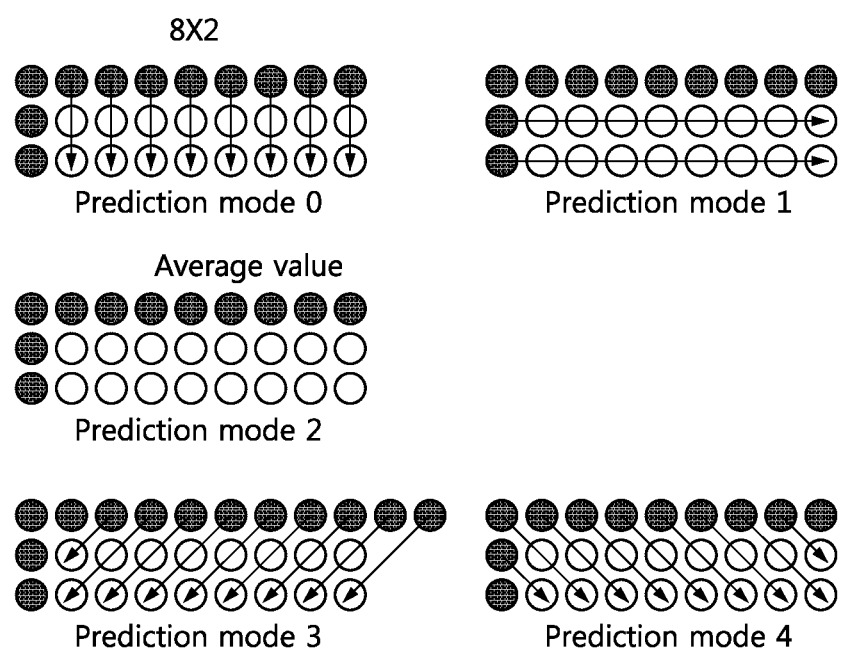
FIG. 6 is a conceptual view illustrating an intra-prediction encoding method using an asymmetrical pixel block according to one example embodiment of the present invention.

FIG. 6 is a conceptual view illustrating an intra-prediction encoding method using an asymmetric pixel block according to an example embodiment of the present invention.

Figure 7:
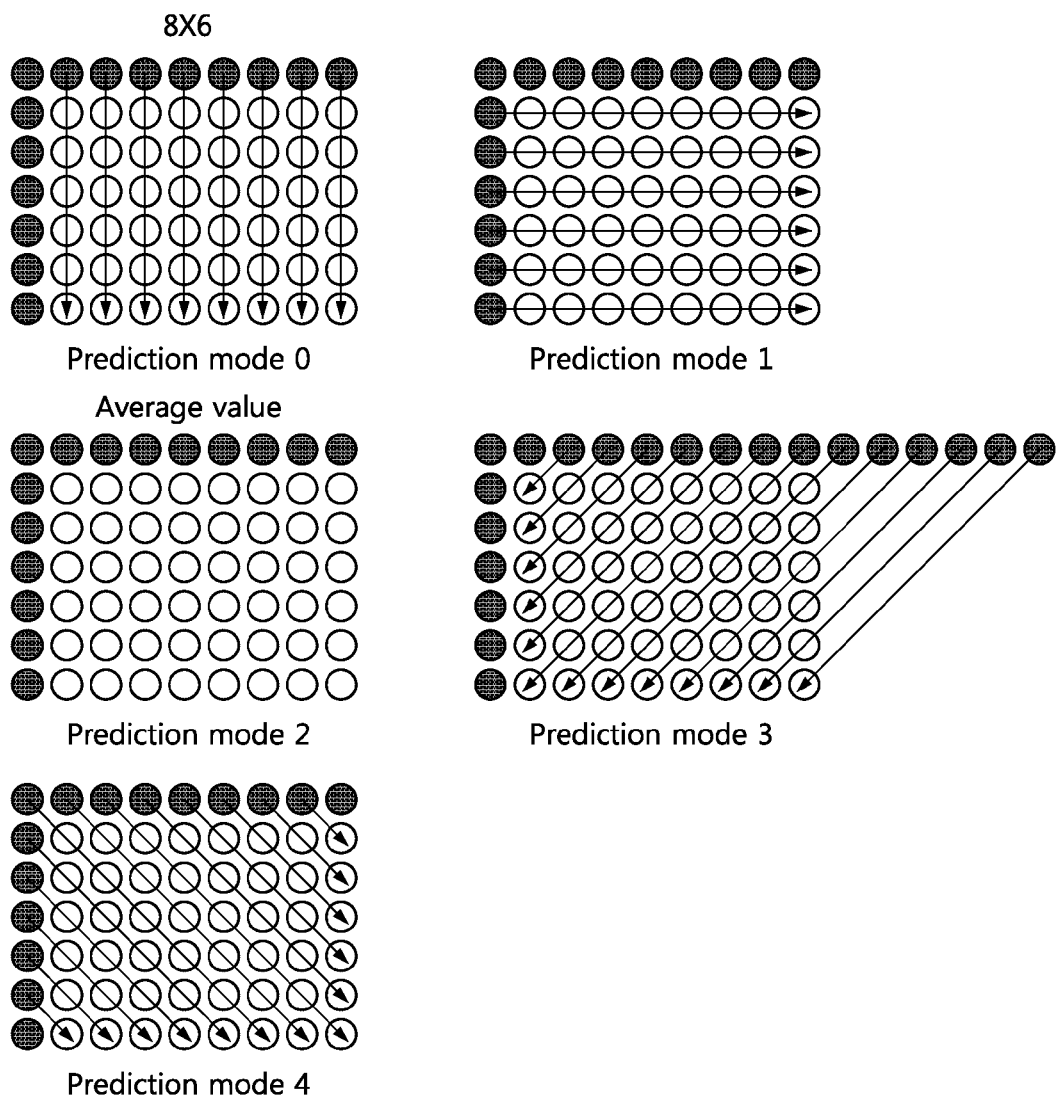
FIGS. 7 to 9 are conceptual views illustrating an intra-prediction encoding method using an asymmetrical pixel block according to another example embodiment of the present invention.
Figure 8:
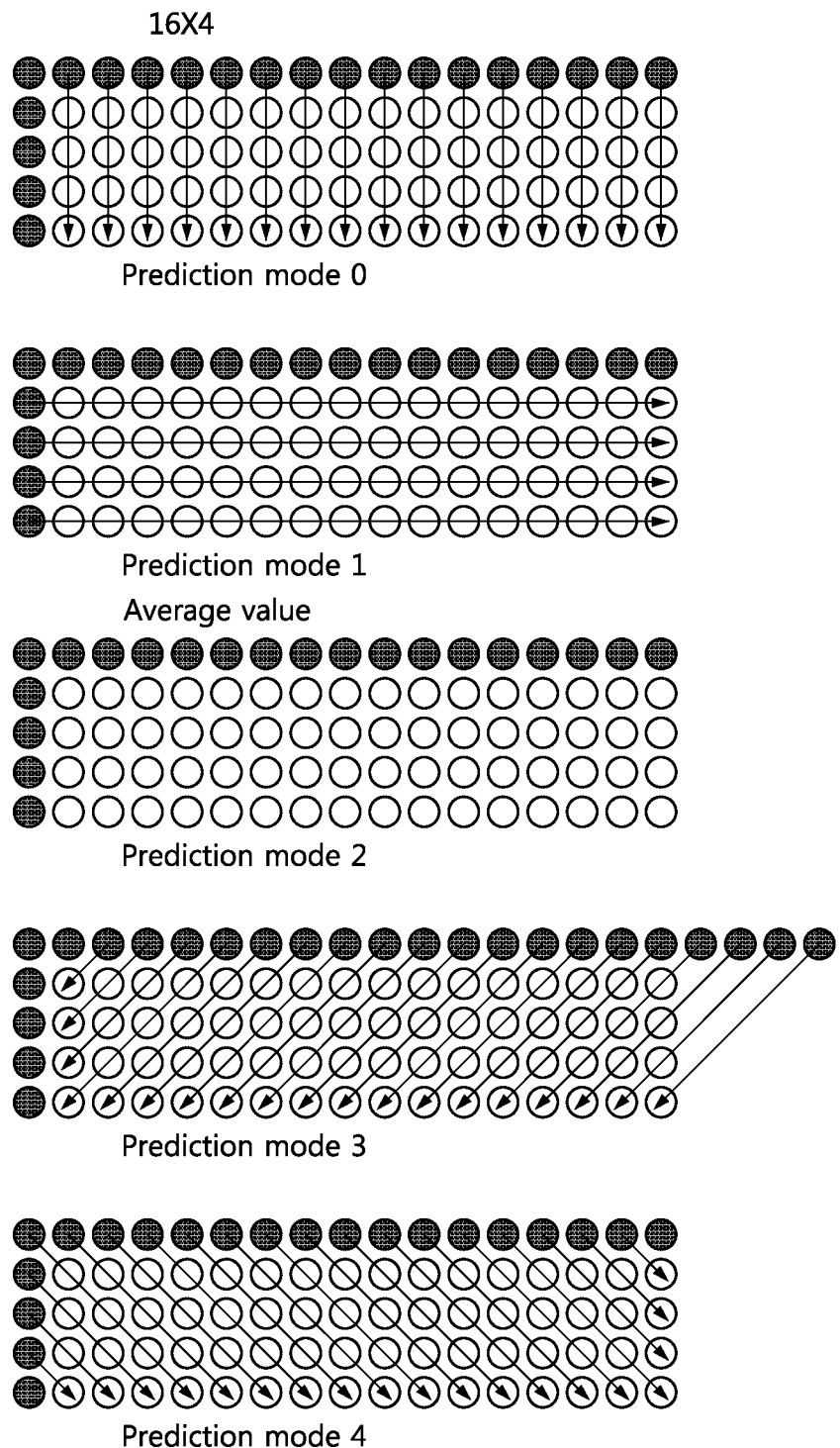
Figure 9:
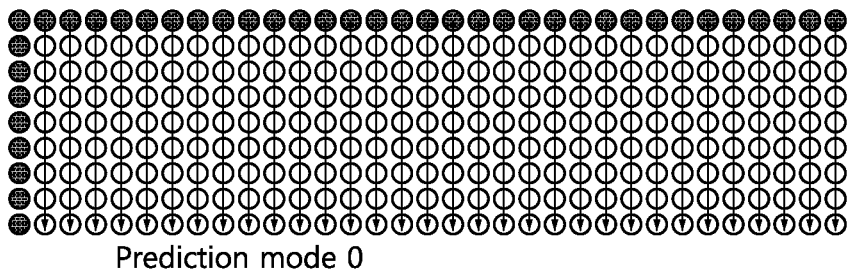
Figure 9:
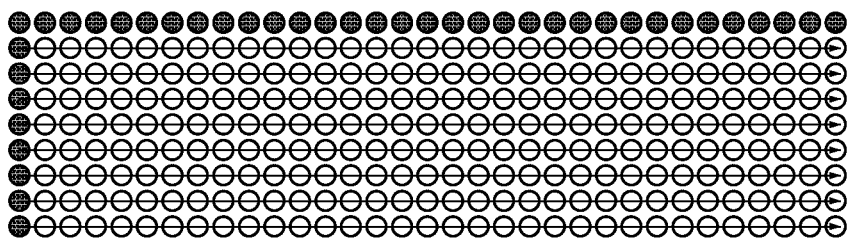
Figure 9:
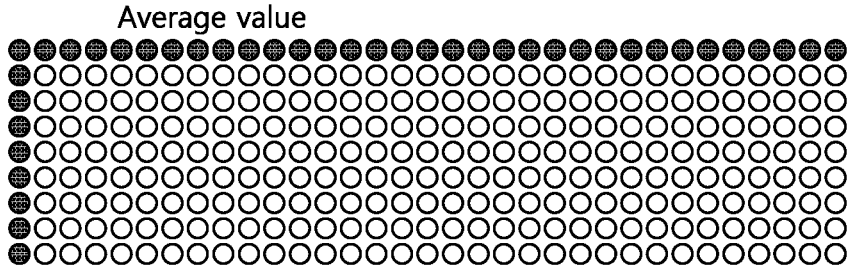
Figure 9:
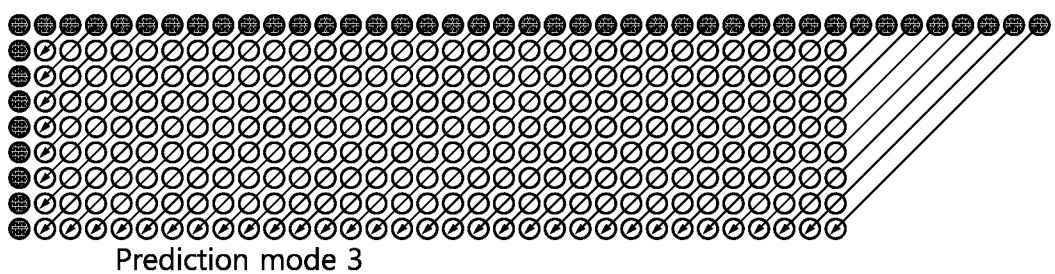
Figure 9:
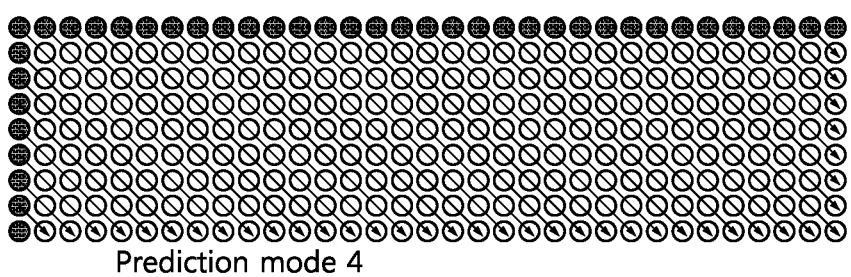

FIGS. 7 to 9 are conceptual views illustrating an intra-prediction encoding method using an asymmetric pixel block according to another example embodiment of the present invention. FIGS. 6 to 9 illustrate an example of intra prediction when the asymmetric partitioning described in connection with FIGS. 2 to 5 is used. However, the present invention is not limited thereto. The intra-prediction encoding method illustrated in FIGS. 6 to 9 may also apply to when various types of asymmetric partitioning illustrated in FIGS. 2 to 5 are used.

FIG. 6 is a view for describing a prediction mode to perform intra prediction on partition P11d having a size of 8×2 obtained by performing asymmetric partitioning on the prediction unit PU whose size is 8×8 in a horizontal direction.

Referring to FIG. 6, a pixel value in partition P11d having a size of 8×2 is predicted using a pixel value in a block previously encoded along the prediction directions including a vertical direction (prediction mode 0), horizontal direction (prediction mode 1), average value prediction (prediction mode 2), diagonal down-right direction (prediction mode 3), and diagonal down-left direction (prediction mode 4).

For example, in the case of prediction mode 0, as the prediction pixel value in the partition P11d having a size of 8×2, the pixel value positioned along the vertical direction in the previously encoded upper block is used.

In the case of prediction mode 1, as the prediction pixel value in the partition P11d having a size of 8×2, the pixel value positioned along the horizontal direction in the previously encoded left block is used.

In the case of prediction mode 2, as the prediction pixel value in the partition P11d having a size of 8×2, the average value of the pixels in the previously encoded left and upper blocks is used.

In the case of prediction mode 3, as the prediction pixel value in the partition P11d having a size of 8×2, the pixel value positioned along the diagonal down-right direction in the previously encoded upper block is used. In the case of prediction mode 3, when the pixel in the upper block of the partition P11d is not sufficient, two pixels in the upper and right block may be used to make it up.

In the case of prediction mode 4, as the prediction pixel value in the partition P11d having a size of 8×2, the pixel value positioned along the diagonal down-left direction in the previously encoded left and upper block is used.

FIG. 7 illustrates a prediction mode for performing intra prediction on partition P21d having a size of 8×6 obtained by performing asymmetric partitioning on the prediction unit PU whose size is 8×8 in the horizontal direction.

Referring to FIG. 7, a pixel value in partition P21d having a size of 8×6 is predicted using a pixel value in a block previously encoded along the prediction directions including a vertical direction (prediction mode 0), horizontal direction (prediction mode 1), average value prediction (prediction mode 2), diagonal down-right direction (prediction mode 3), and diagonal down-left direction (prediction mode 4).

For example, in the case of prediction mode 0, as the prediction pixel value in the partition P21d having a size of 8×6, the pixel value positioned along the vertical direction in the previously encoded upper block is used.

In the case of prediction mode 1, as the prediction pixel value in the partition P21d having a size of 8×6, the pixel value positioned along the horizontal direction in the previously encoded left block is used.

In the case of prediction mode 2, as the prediction pixel value in the partition P21d having a size of 8×6, the average value of the pixels in the previously encoded left and upper blocks is used.

In the case of prediction mode 3, as the prediction pixel value in the partition P21d having a size of 8×6, the pixel value positioned along the diagonal down-right direction in the previously encoded upper block is used. In the case of prediction mode 3, when the pixel in the upper block of the partition P21d is not sufficient, six pixels in the upper and right block may be used to make it up.

In the case of prediction mode 4, as the prediction pixel value in the partition P21d having a size of 8×6, the pixel value positioned along the diagonal down-left direction in the previously encoded left and upper block is used.

FIG. 8 illustrates a prediction mode for performing intra prediction on partition P11c having a size of 16×4 obtained by performing asymmetric partitioning on the prediction unit PU whose size is 16×16 in the horizontal direction.

Referring to FIG. 8, a pixel value in partition P11c having a size of 16×4 is predicted using a pixel value in a block previously encoded along the prediction directions including a vertical direction (prediction mode 0), horizontal direction (prediction mode 1), average value prediction (prediction mode 2), diagonal down-right direction (prediction mode 3), and diagonal down-left direction (prediction mode 4).

For example, in the case of prediction mode 0, as the prediction pixel value in the partition P11c having a size of 16×4, the pixel value positioned along the vertical direction in the previously encoded upper block is used.

In the case of prediction mode 1, as the prediction pixel value in the partition P11c having a size of 16×4, the pixel value positioned along the horizontal direction in the previously encoded left block is used.

In the case of prediction mode 2, as the prediction pixel value in the partition P11c having a size of 16×4, the average value of the pixels in the previously encoded left and upper blocks is used.

In the case of prediction mode 3, as the prediction pixel value in the partition P11c having a size of 16×4, the pixel value positioned along the diagonal down-right direction in the previously encoded upper block is used. In the case of prediction mode 3, when the pixel in the upper block of the partition P11c is not sufficient, four pixels in the upper and right block may be used to make it up.

In the case of prediction mode 4, as the prediction pixel value in the partition P11c having a size of 16×4, the pixel value positioned along the diagonal down-left direction in the previously encoded left and upper block is used.

FIG. 9 illustrates a prediction mode for performing intra prediction on partition P11b having a size of 32×8 obtained by performing asymmetric partitioning on the prediction unit PU whose size is 32×32 in the horizontal direction.

Referring to FIG. 9, a pixel value in partition P11b having a size of 32×8 is predicted using a pixel value in a block previously encoded along the prediction directions including a vertical direction (prediction mode 0), horizontal direction (prediction mode 1), average value prediction (prediction mode 2), diagonal down-right direction (prediction mode 3), and diagonal down-left direction (prediction mode 4).

For example, in the case of prediction mode 0, as the prediction pixel value in the partition P11b having a size of 32×8, the pixel value positioned along the vertical direction in the previously encoded upper block is used.

In the case of prediction mode 1, as the prediction pixel value in the partition P11b having a size of 32×8, the pixel value positioned along the horizontal direction in the previously encoded left block is used.

In the case of prediction mode 2, as the prediction pixel value in the partition P11b having a size of 32×8, the average value of the pixels in the previously encoded left and upper blocks is used.

In the case of prediction mode 3, as the prediction pixel value in the partition P11b having a size of 32×8, the pixel value positioned along the diagonal down-right direction in the previously encoded upper block is used. In the case of prediction mode 3, when the pixel in the upper block of the partition P11b is not sufficient, eight pixels in the upper and right block may be used to make it up.

In the case of prediction mode 4, as the prediction pixel value in the partition P11b having a size of 32×8, the pixel value positioned along the diagonal down-left direction in the previously encoded left and upper block is used.

FIGS. 6 to 9 illustrate examples of using a predetermined number of prediction modes for each size of the prediction unit for the asymmetric partition block, and prediction modes along the other directions (not shown) for each prediction unit may also be used. For example, the intra prediction may be performed along lines formed at the same predetermined angle (e.g., 22.5° or 11.25°) all over the entire direction within 360° using pixel values in the previously encoded left and upper blocks. Or, any angle may be previously designated by the encoder so that the intra prediction may be performed along a line defined according to the designated angle. To designate the angle, for example, a slope with dx along the horizontal direction and dy along the vertical direction may be defined, and information on dx and dy may be transferred from the encoder to the decoder. Predetermined angle information may also be transferred from the encoder to the decoder.

Figure 10:
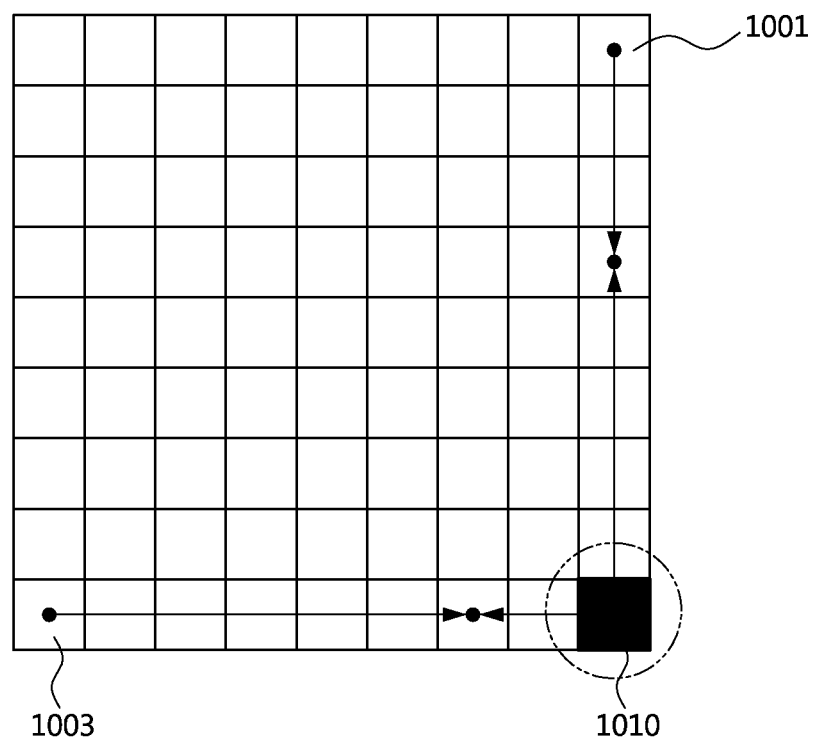
FIG. 10 is a conceptual view illustrating an intra-prediction encoding method based on planar prediction according to another example embodiment of the present invention.

FIG. 10 is a concept view illustrating an intra-prediction encoding method based on planar prediction according to another example embodiment of the present invention.

In the case that an extended macro-block having a size of 16×16 or more is used to encode a high-resolution image having a HD or higher resolution or the size of the prediction unit is increased to 8×8 or more, if the existing intra prediction mode applies to the rightmost and lowermost pixel value of the prediction unit, distortion is created by the prediction, thus rendering it difficult to smooth the image as a smooth one.

In such case, a separate planar mode may be defined, and when the planar mode flag is activated, as shown in FIG. 10, in order to obtain predicted pixel value of the rightmost and lowermost pixel (1010) of the prediction unit, a linear interpolation may be performed using value of the pixels (1001 and 1003) and/or the value of inner pixels of prediction block. The pixel 1001 is located in previously encoded upper block of the prediction unit and corresponds to the rightmost and lowermost pixel (1010) in a vertical direction. The pixel 1003 is located in previously encoded left block of the prediction unit and corresponds to the rightmost and lowermost pixel (1010) in a horizontal direction. The inner pixels are pixels which are located inside the prediction block and the inner pixels correspond to the rightmost and lowermost pixel (1010) in a horizontal direction and a vertical direction.

Namely, when the planar mode flag is activated, as shown in FIG. 10, in order to obtain predicted pixel value of the rightmost and lowermost pixel (for example pixel 1010) of the prediction unit, a linear interpolation may be performed using value of the pixels (1001 and 1003). The pixel 1001 is located in previously encoded upper block of the prediction unit and corresponds to the rightmost and lowermost pixel (1010) in a vertical direction. The pixel 1003 is located in previously encoded left block of the prediction unit and corresponds to the rightmost and lowermost pixel (1010) in a horizontal direction.

Alternatively, when the planar mode flag is activated, as shown in FIG. 10, in order to obtain predicted pixel value of the rightmost and lowermost pixel (for example pixel 1010) of the prediction unit, a linear interpolation may be performed using value of the pixels (1001 and 1003) and inner pixels. The pixel 1001 is located in previously encoded upper block of the prediction unit and corresponds to the rightmost and lowermost pixel (1010) in a vertical direction and the pixel 1003 is located in previously encoded left block of the prediction unit and corresponds to the rightmost and lowermost pixel (1010) in a horizontal direction. The inner pixels are located inside the prediction block and the inner pixels correspond to the rightmost and lowermost pixel (1010) in a horizontal direction and a vertical direction. When the planar mode flag is activated, the rightmost and lowermost pixel (1010) value of the prediction unit may be transferred from the encoder to the decoder. Here, vertically and/or horizontally directional corresponding pixel values (1001, 1003) in the previously encoded left side block and upper end block indicates pixel values of the pixels in the left side block and upper end block among already encoded blocks adjacent to the prediction block in case the current prediction unit consists of 8×8 prediction blocks as shown in FIG. 10, a horizontally directional corresponding pixel value of the pixel 1010 positioned at the rightmost and lowermost end of the prediction unit indicates value of the pixel 1003, and a vertically directional corresponding pixel value of the pixel 1010 positioned at the rightmost and lowermost end of the prediction unit indicates value of the pixel 1001, and a horizontally directional internal prediction pixel value in the prediction block indicates value(s) of at least one of pixels positioned along the horizontal direction between the pixel 1003 and the rightmost and lowermost pixel 1010, and a vertically directional corresponding internal prediction pixel value in the prediction block indicates value(s) of at least one of pixels arranged along the vertical direction between the pixel 1001 and the rightmost and lowermost pixel 1010.

Further, in case the planar prediction mode flag is activated, the prediction pixel value of an internal pixel of the prediction unit may be obtained by performing bilinear interpolation using vertically and/or horizontally directional corresponding pixel values of the pixels in the left side block and upper end block that are previously encoded and/or vertically and/or horizontally directional corresponding internal boundary prediction pixel values in the prediction unit (for example, the vertically and/or horizontally directional corresponding internal boundary prediction pixel values indicates value(s) of at least one of pixels positioned along the horizontal direction between the pixel 1003 and the rightmost and lowermost pixel 1010 or value(s) of at least one of pixels arranged along the vertical direction between the pixel 1001 and the rightmost and lowermost pixel 1010). Here, the prediction pixel values of the internal pixels of the prediction unit indicates prediction pixel values of internal pixels arranged along the horizontal direction in the prediction block (since 8×8 blocks are shown in FIG. 10, there are 8 horizontal lines, and the prediction pixel values of internal pixels arranged along the horizontal direction in the prediction block indicates prediction pixel values of the 8 internal pixels arranged along the direction of each of the 8 horizontal lines) or prediction pixel values of internal pixels arranged along the vertical direction in the prediction block (since 8×8 blocks are shown in FIG. 10, there are 8 vertical lines, and the prediction pixel values of internal pixels arranged along the vertical direction in the prediction block indicates prediction pixel values of the 8 internal pixels arranged along the vertical direction of each of the 8 vertical lines).

In case, in FIG. 10, the prediction pixel value of the internal pixel of the prediction unit is obtained, the vertically and/or horizontally directional corresponding pixel values in the previously encoded left side block and upper end block indicate pixel values of the pixels in the left side block and the upper end block of the previously encoded blocks adjacent to the prediction block. In case the current prediction unit consists of 8×8 prediction blocks as shown in FIG. 10, the horizontally directional corresponding pixel values of the 8 pixels of the rightmost line of the prediction unit (i.e. 8 pixels from the top to the bottom) indicate pixel values of the pixels arranged at the same position along the horizontal direction as the corresponding pixel of the rightmost line of the prediction unit among the previously encoded left side block adjacent to the prediction block, and the vertically directional corresponding pixel values of the 8 pixels of the lowermost end line of the prediction unit (i.e. 8 pixels from the leftmost side to the rightmost side) indicate pixel values of the pixels arranged at the same position along the vertical direction as the corresponding pixel of the lowermost line of the prediction unit.

Further, in case, in FIG. 10, the prediction pixel values of the internal pixels of the prediction unit are obtained, the vertically and/or horizontally directional corresponding internal boundary prediction pixel values of the pixels in the prediction unit indicate pixel values (predicted pixel values) of the pixels positioned at the lowermost line or at the rightmost line in the prediction block. In case the current prediction unit consists of 8×8 prediction blocks as shown in FIG. 10, for example, the internal boundary prediction pixel value of the pixel corresponding to the right-sided seventh pixel among 8 pixels on the fifth horizontal line from the top of the prediction unit may be the pixel value (or predicted pixel value) of the rightmost pixel among the 8 pixels on the fifth horizontal line from the top of the prediction unit. In such case, the predicted pixel value of the right-sided seventh pixel among the 8 pixels on the fifth horizontal line from the top of the prediction unit may be obtained by performing bilinear interpolation using the pixel value (or predicted pixel value) of the rightmost pixel among the 8 pixels on the fifth horizontal line from the top of the prediction unit and the pixel value of the previously encoded pixel arranged at the same position along the horizontal direction as the right-sided seventh pixel among the 8 pixels on the fifth horizontal line from the top of the prediction unit among the pixel values of the pixels in the previously encoded left side block adjacent to the prediction block.

Further, in case, in FIG. 10, the predicted pixel values of the internal pixels of the prediction unit are obtained, vertically and/or horizontally directional corresponding internal boundary prediction pixel values of the pixels in the prediction unit, when the current prediction unit consists of 8×8 prediction blocks as shown in FIG. 10, for example, the internal boundary prediction pixel value of the pixel corresponding to the seventh pixel along the vertical direction from the top among the 8 pixels on the right-sided fifth vertical line from the leftmost side of the prediction unit may be a pixel value of the pixel located at the lowermost end of the 8 pixels on the right-sided fifth vertical line from the leftmost side of the prediction unit.

In such case, the prediction pixel value of the seventh pixel along the vertical direction from the top among the 8 pixels on the right-sided fifth vertical line from the leftmost side of the prediction unit may be obtained by performing bilinear interpolation using the pixel value (or prediction pixel value) of the pixel located at the lowermost end among the 8 pixels on the right-sided fifth vertical line from the leftmost side of the prediction unit and pixel value (or prediction pixel value) of the previously encoded pixel arranged at the same position along the vertical direction as the seventh pixel along the vertical direction from the top among the 8 pixels on the right-sided fifth vertical line from the leftmost side of the prediction unit among the pixel values of the pixels in the previously encoded upper side block adjacent to the prediction block.

Meanwhile, in case the planar prediction mode flag is activated, the pixel value of the rightmost and lowermost end pixel of the prediction unit may be transmitted from the encoder to the decoder. Further, the pixel values of pixels located at the rightmost line of FIG. 10 may be obtained by performing linear interpolation using the rightmost and uppermost pixel 1001 and the rightmost and lowermost pixel 1010 that have been transmitted from the encoder. The pixel values of the pixels located at the lowermost line of FIG. 10 may be obtained by performing linear interpolation using the leftmost and lowermost pixel 1003 and the rightmost and lowermost pixel 1010 that have been transmitted from the encoder.

Figure 11:
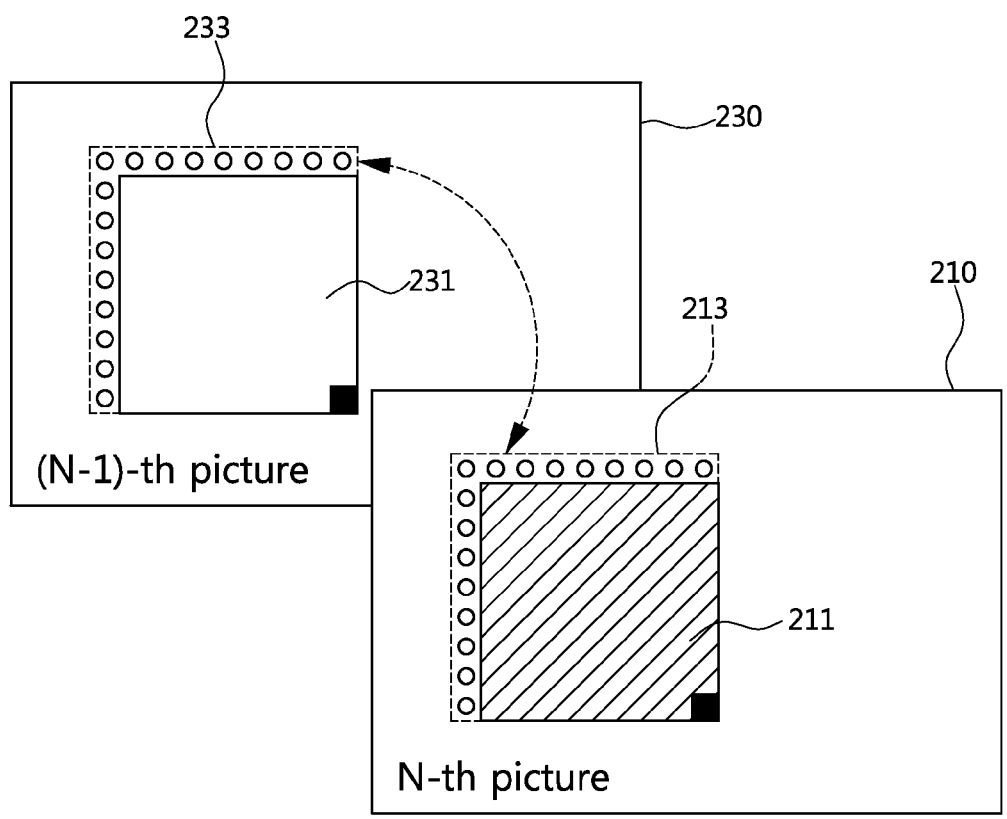
FIG. 11 is a conceptual view illustrating an intra-prediction encoding method based on planar prediction according to another example embodiment of the present invention.

FIG. 11 is a conceptual view illustrating an intra-prediction encoding method based on planar prediction according to another example embodiment of the present invention.

When the planar prediction mode flag is activated, as shown in FIG. 11, a reference prediction unit for a current prediction unit having a first size—for example, 8×8 pixels in FIG. 11—which is included in the Nth picture which is a current picture to be encoded is determined at the N−1 th picture positioned temporarily before the Nth picture. To obtain the prediction pixel value of the rightmost and lowermost pixel in the current prediction unit, not only vertical- and horizontal-directionally corresponding pixel values in the previously encoded left and upper blocks 213, which are adjacent to the current prediction unit, but also vertical- and horizontal-directionally corresponding pixel values in the previously encoded left and upper blocks 233, which are adjacent to the corresponding prediction unit of the N−1th picture are used to calculate their average values or to perform linear interpolation.

Or, to obtain the prediction pixel value of the rightmost and lowermost pixel in the current prediction unit, vertical- and horizontal-directionally corresponding inner pixel values in the current prediction unit of the Nth picture, as well as vertical- and horizontal-directionally corresponding pixel values in the previously encoded left and upper blocks 213, which are adjacent to the current prediction unit, and vertical- and horizontal-directionally corresponding pixel values in the previously encoded left and upper blocks 233, which are adjacent to the corresponding prediction unit of the N−1th picture are used to calculate their average values or to perform linear interpolation.

Further, to obtain the prediction pixel value of the rightmost and lowermost pixel in the current prediction unit, vertical- and horizontal-directionally corresponding inner pixel values of the rightmost and lowermost pixel in the corresponding unit of the N−1th picture, as well as vertical- and horizontal-directionally corresponding inner pixel values in the current prediction unit of the Nth picture, vertical- and horizontal-directionally corresponding pixel values in the previously encoded left and upper blocks 213, which are adjacent to the current prediction unit, and vertical- and horizontal-directionally corresponding pixel values in the previously encoded left and upper blocks 233, which are adjacent to the corresponding prediction unit of the N−1 th picture are used to calculate their average values or to perform linear interpolation.

Also, in the case that the planar prediction mode flag is activated, the prediction pixel value of the inner pixel in the prediction unit of the Nth picture may be obtained by performing bilinear interpolation using vertical- and horizontal-directionally corresponding inner boundary pixel values in the corresponding prediction unit of the N−1th picture, vertical- and horizontal-directionally corresponding pixel values in the previously encoded left and upper blocks in the corresponding prediction unit of the N−1th picture, vertical- and horizontal-directionally corresponding inner boundary pixel values in the current prediction unit of the Nth picture and/or vertical- and horizontal-directionally corresponding pixel values in the previously encoded left and upper blocks in the current prediction unit of the Nth picture.

Although FIG. 11 illustrates an example where intra prediction is conducted using the current prediction unit of the Nth picture and a corresponding prediction unit of the N−1th picture, the present invention is not limited thereto. For example, the intra prediction may also be performed using the current prediction unit of the Nth picture and a corresponding prediction unit of the N+1 th picture, using the current prediction unit of the Nth picture and corresponding prediction units of the N−1th picture and the N+1th picture, or using the current prediction unit of the Nth picture and corresponding prediction units of the N−2th picture, N−1th picture, N+1th picture, and N+2th picture.

The current prediction unit having the second size may have a square shape with 8×8, 16×16, or 32×32 pixels or may have an asymmetric shape as illustrated in FIGS. 2 to 5. In the case that the current prediction unit has an asymmetric shape as illustrated in FIGS. 2 to 6, the embodiments described in connection with FIGS. 10 and 11 may apply in order to perform inter prediction.

That is, the intra prediction encoding method based on the planar prediction as shown in FIGS. 10 and 11 may be applicable to intra prediction encoding/decoding for pixel blocks the prediction unit of which has a symmetrical shape, such as a rectangle or square, as well as pixel blocks the prediction unit of which has an asymmetrical shape or any geometrical shape.

Figure 12:
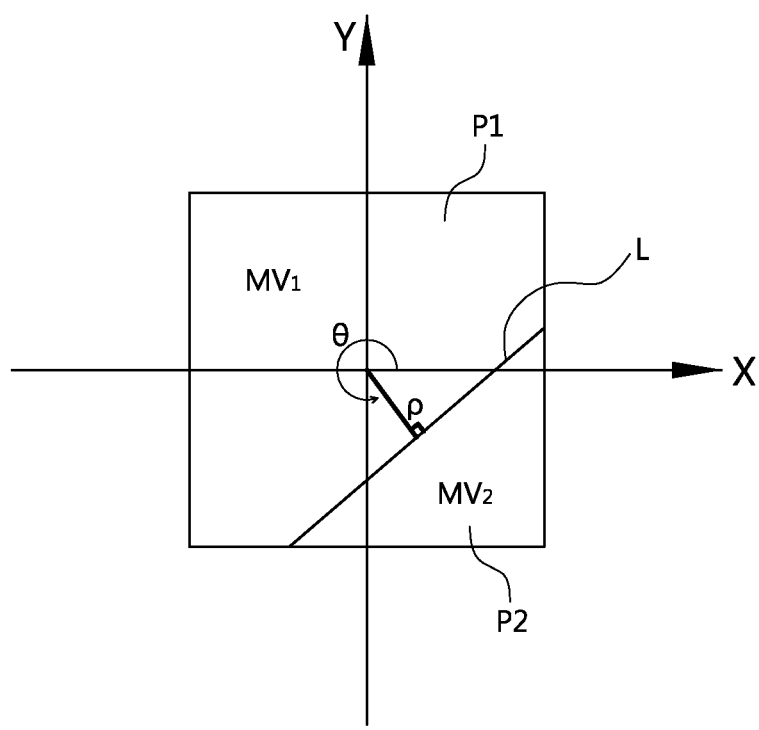
FIG. 12 is a conceptual view illustrating a geometrical partitioning process according to another example embodiment of the present invention.

FIG. 12 is conceptual view illustrating geometrical partitioning according to another example embodiment of the present invention.

FIG. 12 illustrates an example where the prediction unit PU is subjected to geometrical partitioning so that the split partitions have a shape other than square.

Referring to FIG. 12, for the prediction unit, a geometrical boundary line L between partitions may be defined as follows. The prediction unit PU is divided into four quadrants by x and y axes passing through the center O of the prediction unit PU. A vertical line is drawn from the center O to the boundary line L. Then, any possible boundary line L positioned in any direction may be specified by a distance ρ from the center O to the boundary line L and an angle θ from the x axis to the vertical line in a counterclockwise direction.

For inter or intra prediction, the prediction unit PU is divided into four quadrants with respect to its center. The second quadrant which is the upper and left portion of the prediction unit PU is split into a partition, and the remaining L-shaped quadrants are split into a partition. As used herein, the "portion" of the prediction unit PU, which corresponds to a split partition or several split partitions, is also called "block". Or, the third quadrant which is the lower and left portion of the prediction unit PU is split into a partition', and the remaining quadrants are split into a partition. Alternatively, the first quadrant which is the upper and right portion of the prediction unit PU is split into a partition, and the remaining quadrants are split into a partition. Also, the lower and right portion of the prediction unit PU which corresponds to the fourth quadrant is split into a partition, with the remaining quadrants slit into a partition. Further, the fourth quadrant, the lower and right portion of the prediction unit PU, is split into a partition, with the remaining quadrants split into a partition.

As described above, the prediction unit may be split so that a split partition has an L shape. Accordingly, in the case that, upon partitioning, there is a moving object in an edge block, e.g., the upper and left, upper and right, lower and right, or lower and left block, it may provide more effective encoding than when the prediction unit PU is split into four blocks. Depending on the edge block in which the moving object is positioned among the four partitions, the corresponding partition may be selected and used.

The size of the block used for motion estimation may vary. In addition, according to one example embodiment, when asymmetric partitioning or geometrical partitioning applies, the shape of the block may have not only the existing square shape but also geometrical shapes, such as a rectangular or other asymmetric shapes, an 'L' shape, or a triangular shape, as shown in FIGS. 2 to 9.

Also in the case of the above-described geometrical block partitioning including the block partitioning described in connection with FIG. 10, the prediction modes applied in FIGS. 6 to 9 may be transformed and utilized to perform intra prediction on the geometrical blocks.

Figure 13:
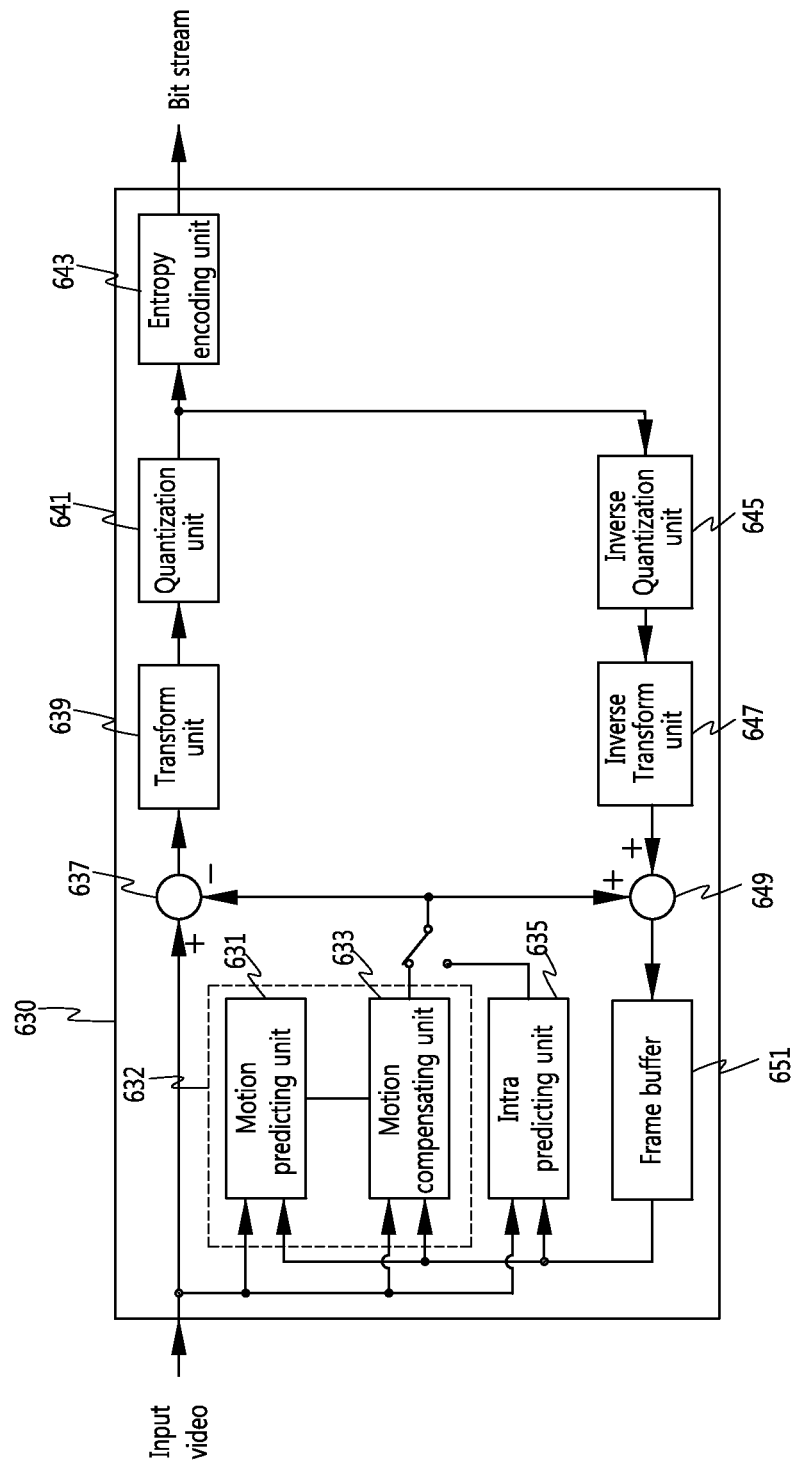
FIG. 13 is a block diagram illustrating a configuration of an image encoding apparatus performing intra-prediction encoding according to one example embodiment of the present invention.

FIG. 13 is a block diagram illustrating a configuration of an image encoding apparatus to perform intra-prediction encoding according to an example embodiment of the present invention.

Referring to FIG. 13, the image encoding apparatus includes an encoder 630. The encoder 630 includes an inter predicting unit 632, an intra predicting unit 635, a subtractor 637, a transform unit 639, a quantization unit 641, an entropy encoding unit 643, an inverse quantization unit 645, an inverse transform unit 647, an adder 649, and a frame buffer 651. The inter predicting unit 632 includes a motion predicting unit 631 and a motion compensating unit 633.

The encoder 630 performs encoding on an input image. The input image may be used on a per-prediction unit PU basis for inter prediction in the inter predicting unit 632 or for intra prediction in the intra predicting unit 635.

The size of the prediction unit applying to inter prediction or intra prediction may be determined according to temporal frequency characteristics of a frame (or picture) stored in a buffer (not shown) included in the encoder after the input image is stored in the buffer. For example, the prediction unit determining unit 610 analyzes the temporal frequency characteristics of the n−1th frame (or picture) and the nth frame (or picture), and if the analyzed temporal frequency characteristics value is less than a preset first threshold value, determines the size of the prediction unit as 64×64 pixels. If the analyzed temporal frequency characteristics value is equal to and more than the preset first threshold value and less than a second threshold value, the size of the prediction unit is determined as 32×32 pixels, and if the analyzed temporal frequency characteristics value is equal to or more than the preset second threshold value, the size of the prediction unit is determined as 16×16 pixels or less. Here, the first threshold value refers to a temporal frequency characteristics value when a variance between frames (or pictures) is smaller than the second threshold value.

The size of the prediction unit applying to inter prediction or intra prediction may be determined according to spatial frequency characteristics of a frame (or picture) stored in a buffer (not shown) included in the encoder after the input image is stored in the buffer. For example, in the case that the input frame (or picture) has high uniformity or homogeneity, the size of the prediction unit may be set to be large, for example, to 32×32 pixels or more, and in the case that the input frame (or picture) has low uniformity or homogeneity (that is, when spatial frequency is high), the size of the prediction unit may be set to be small, for example, to 16×16 pixels or less.

Although not shown in FIG. 13, the operation of determining the size of the prediction unit may be performed by an encoding controller (not shown) receiving the input image or by a separate prediction unit determining unit (not shown) receiving the input image. For example, the size of the prediction unit may be 16×16, 32×32, or 64×64 pixels.

As described above, the prediction unit information including the size of the prediction unit determined for inter or intra prediction is provided to the entropy encoding unit 643 and provided to the encoder 630 on the basis of the prediction unit having the determined size. Specifically, in the case that encoding and decoding are performed using the extended macro-block and the size of the extended macro-block, the prediction block information may include information on the size of the macro-block or the extended macro-block. Here, the size of the extended macro-block refers to 32×32 pixels or more, including, for example, 32×32, 64×64, or 128×128 pixels. In the case that the above-mentioned recursive coding unit CU is used to perform encoding and decoding, the prediction unit information may include, instead of the information on the size of the macro-block, information on the size of the maximum coding unit LCU to be used for inter or intra prediction, that is, the size of the prediction unit, and further, the prediction unit information may include the size of the maximum coding unit LCU, the size of the minimum coding unit SCU, the maximum permissible level or level depth, and flag information.

The encoder 630 performs encoding on the prediction unit having the determined size.

The inter predicting unit 632 splits the prediction unit to be currently encoded by the above-described asymmetric partitioning or geometrical partitioning and performs motion estimation on a per-split partition basis to generate a motion vector.

The motion predicting unit 631 splits the provided current prediction unit by various partitioning methods and searches a region similar to the partitioned block to be currently encoded in at least one reference picture (which is encoded and stored in the frame buffer 651) positioned before and/or behind the currently encoded picture for each partitioned block, thereby generating a motion vector on a per-block basis. The size of the block used for motion estimation may vary, and according to an embodiment, when asymmetric partitioning or geometrical partitioning applies, the shape of the block may have not only the existing square shape but also geometrical shapes, such as a rectangular or other asymmetric shapes, an 'L' shape, or a triangular shape, as shown in FIGS. 2 to 9.

The motion compensating unit 633 generates a prediction block (or predicted prediction unit) by performing motion compensation using the reference picture and the motion vector generated from the motion predicting unit 631.

The inter predicting unit 632 performs block merging on the block and obtains a motion parameter for each merged block. The obtained motion parameter is transferred to the decoder.

The intra predicting unit 635 may perform intra-prediction encoding using a pixel correlation between blocks. The intra predicting unit 635 performs intra prediction that seeks the prediction block of the current prediction unit by predicting a pixel value from previously encoded pixel values in the block of the current frame (or picture) according to various embodiments as described in connection with FIGS. 6 to 11.

The subtractor 637 performs subtraction between the prediction block (or predicted prediction unit) provided from the motion compensating unit 633 and the current block (or current prediction unit) to generate a residue, and the transform unit 639 and the quantization unit 641 respectively perform DCT (Discrete Cosine Transform) and quantization on the residue. Here, the transform unit 639 may perform transform based on the prediction unit size information provided from the prediction unit determining unit 1810. For example, the transform unit 639 may conduct transform to a size of 32×32 or 64×64 pixels. Or, the transform unit 639 may perform transform on the basis of a separate transform unit TU independently from the prediction unit size information provided from the prediction unit determining unit 610. For example, the transform unit TU size may have the minimum of 4×4 pixels to the maximum of 64×64 pixels. Or, the maximum size of the transform unit TU may be more than 64×64 pixels—for example, 128×128 pixels. The transform unit size information may be included in the transform unit information and transferred to the decoder.

The entropy encoding unit 643 performs entropy encoding on header information including quantized DCT coefficients, motion vector, determined prediction unit information, partition information, and transform unit information, thereby generating a bit stream.

The inverse quantization unit 645 and the inverse transform unit 647 respectively perform inverse quantization and inverse transform on the data quantized by the quantization unit 641. The adder 649 adds the inverse transformed data to the predicted prediction unit provided from the motion compensating unit 633 to reconstruct the image and provides the reconstructed image to the frame buffer 651, so that the frame buffer 651 stores the stored image.

Figure 14:
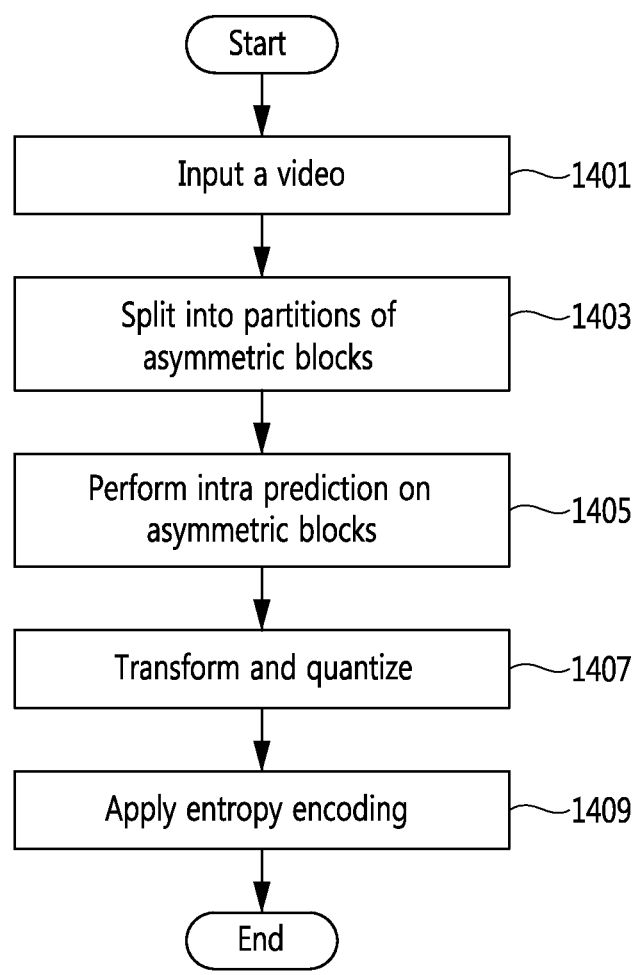
FIG. 14 is a flowchart illustrating an image encoding method applied with intra-prediction encoding according to one example embodiment of the present invention.

FIG. 14 is a flowchart illustrating an image encoding method applied with intra-prediction encoding according to an example embodiment of the present invention.

Referring to FIG. 14, when an image is input to the encoding apparatus (step S1401), for the input image, the prediction unit for inter or intra prediction is split by the above-described asymmetric or geometrical partitioning method (step S1403).

In the case that the intra prediction mode is activated, the partitioned asymmetric block or geometric block is applied with the intra prediction method described in connection with FIGS. 6 to 11, thereby performing intra prediction (step S1405).

Or, when the inter prediction mode is activated, the prediction block (or predicted prediction unit) is generated by searching a region similar to the partitioned block to be currently encoded in at least one reference picture (which is encoded and stored in the frame buffer 651) positioned before and/or behind the currently encoded picture for each partitioned block, thereby generating a motion vector on a per-block basis, followed by performing motion compensation using the generated motion vector and picture.

Next, the encoding apparatus obtains a difference between the current prediction unit and the predicted (intra-predicted or inter-predicted) prediction unit to generate a residue, then performing transform and quantization on the generated residue (step S1407). Thereafter, the encoding apparatus entropy-encodes the header information including quantized DCT coefficients and motion parameter and generates a bit stream (step S1409).

Figure 15:
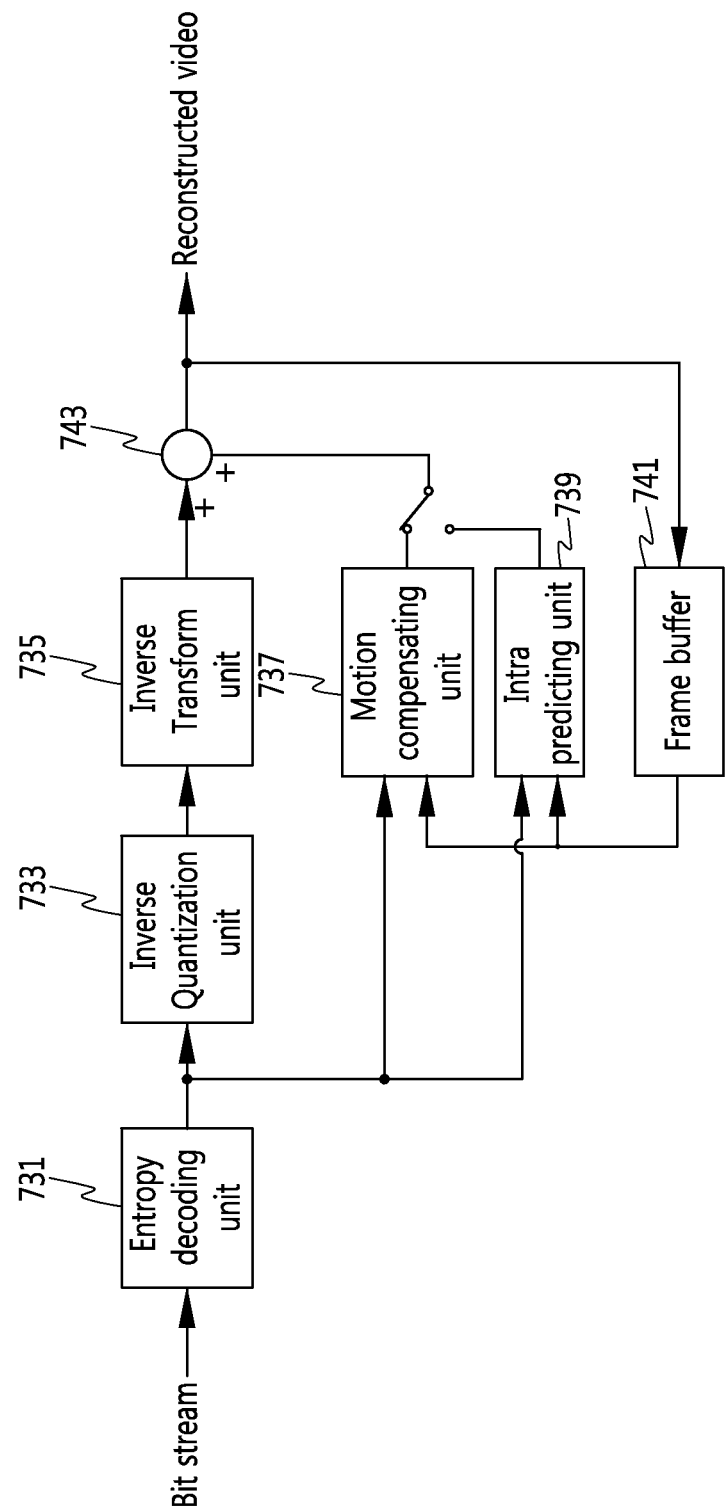
FIG. 15 is a block diagram illustrating a configuration of an image decoding apparatus according to one example embodiment of the present invention.

FIG. 15 is a block diagram illustrating a configuration of an image decoding apparatus according to an example embodiment of the present invention.

Referring to FIG. 15, the decoding apparatus includes an entropy decoding unit 731, an inverse quantization unit 733, an inverse transform unit 735, a motion compensating unit 737, an intra predicting unit 739, a frame buffer 741, and an adder 743.

The entropy decoding unit 731 receives a compressed bit stream and performs entropy decoding on the compressed bit stream thereby generating a quantized coefficient. The inverse quantization unit 733 and the inverse transform unit 735 respectively perform inverse quantization and inverse transform on the quantized coefficient to reconstruct the residue.

The header information decoded by the entropy decoding unit 731 may include the prediction unit size information which may include, e.g., 16×16, 32×32, 64×64, or 128×128 pixels of the size of the extended macro-block. Further, the decoded header information includes the motion parameters for motion compensation and prediction. The motion parameter may include the motion parameter transmitted for each block merged by a block merging method according to an embodiment. The decoder header information also includes a flag indicating whether the planar mode is activated and the per-unit prediction mode information having the above-mentioned asymmetric shape.

The motion compensating unit 737 performs motion compensation, using the motion parameter, on the prediction unit having the same size as the prediction unit encoded based on the decoded header information from the bit stream by the entropy decoding unit 731, thereby generating the predicted prediction unit. The motion compensating unit 737 performs motion compensation using the motion parameter transmitted for each block merged by the block merging method according to an embodiment, thereby generating the predicted prediction unit.

The intra predicting unit 739 performs intra-prediction encoding using a pixel correlation between blocks. The intra predicting unit 739 may obtain the prediction pixel value of the current prediction unit by the intra-prediction encoding method described in connection with FIGS. 6 to 11.

The adder 743 adds the residue provided from the inverse transform unit 735 to the predicted prediction unit provided from the motion compensating unit 737 or the intra predicting unit 739 to reconstruct the image and provides the reside to the frame buffer 741 so that the frame buffer 741 stores the reconstructed image.

Figure 16:
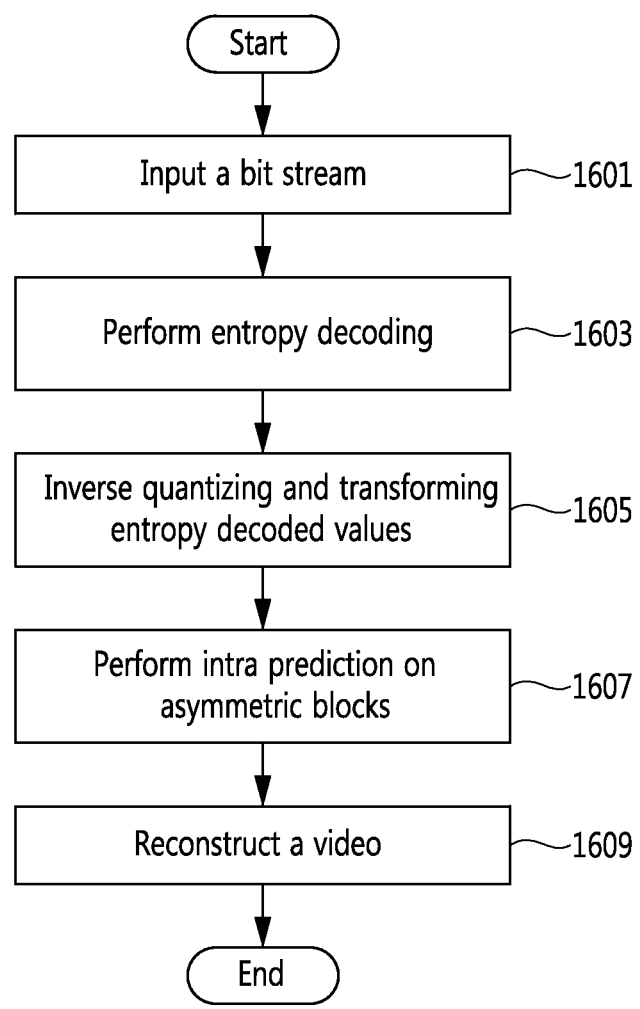
FIG. 16 is a flowchart illustrating an image decoding method according to one example embodiment of the present invention.

FIG. 16 is a flowchart illustrating an image decoding method according to an example embodiment of the present invention.

Referring to FIG. 16, the decoding apparatus receives the bit stream from the encoding apparatus (step S1601).

Thereafter, the decoding apparatus performs entropy decoding on the received bit stream (step S1603). The data decoded by entropy decoding includes the residue which refers to a difference between the current prediction unit and the predicted prediction unit. The header information decoded by the entropy decoding may include prediction unit information, motion parameters for motion compensation and prediction, a flag indicating whether planar prediction mode is activated, and asymmetric-type per-prediction unit prediction mode information. The prediction unit information may include prediction unit size information.

Here, in the case that, instead of performing encoding and decoding using the extended macro-block and the size of the extended macro-block, the above-mentioned recursive coding unit CU is used for encoding and decoding, the prediction unit PU information may include the sizes of the maximum coding unit LCU and minimum coding unit SCU, the maximum permissible level or level depth, and flag information.

A decoding controller (not shown) may receive from the encoding apparatus the prediction unit PU size information applied in the encoding apparatus and may perform to-be-described motion compensation decoding, intra-prediction encoding, inverse transform, or inverse quantization according to the size of the prediction unit PU applied in the encoding apparatus.

The decoding apparatus inverse-quantizes and inverse-transforms the entropy-encoded residue (step S1605). The inverse transform may be performed on the basis of the prediction unit size (for example, 32×32 or 64×64 pixels).

The decoding apparatus applies inter prediction or intra prediction method to the prediction unit having various shapes, such as the asymmetric or geometrical shapes described in connection with FIGS. 6 to 11, thereby generating the predicted prediction unit (step S1607).

The decoder adds the inverse-quantized, inverse-transformed residue to the prediction unit predicted through the inter or intra prediction, thereby reconstructing the image (step S1609).

Although the example embodiments of the present invention have been described, it will be understood by one of ordinary skill that various modifications can be made to the present invention without departing from the scope of the invention defined by the appended claims.

The invention claimed is:

1. A method performed by an apparatus for decoding an image, the method comprising:
   restoring a residue by entropy-decoding a received bit stream and by performing inverse quantization and inverse transform on the residue;
   generating a prediction unit by performing intra-prediction that selectively uses one of a plurality of prediction modes; and
   restoring the image by adding the residue to the prediction unit,
   wherein when a planar intra prediction mode is activated, a predicted pixel value of an internal pixel of a current prediction unit is obtained by performing bilinear interpolation using (i) vertically and horizontally directional corresponding pixel values in previously decoded left side block and upper end block of the current prediction unit, and (ii) vertically and horizontally directional corresponding internal boundary prediction pixel values in the current prediction unit, wherein the vertically and horizontally directional corresponding pixel values in the previously decoded left side block and upper end block of the current prediction unit include:
   a pixel value of a third pixel which is located on a lowermost boundary of the upper end block of the current prediction unit and on the same vertical column as the internal pixel, and a pixel value of a fourth pixel which is located on a rightmost boundary of the left side block of the current prediction unit and on the same horizontal row as the internal pixel.

2. The method of claim 1, further comprising:
achieving a partition splitting by using a method of an asymmetric partitioning, wherein the asymmetric partitioning is conducted along a horizontal direction to split the prediction unit
into a first partition having a size of 64×16 and a second partition having a size of 64×48, or
into a first partition having a size of 64×48 and a second partition having a size of 64×16.

3. The method of claim 1, further comprising:
achieving a partition splitting by using a method of an asymmetric partitioning, wherein the asymmetric partitioning is performed along a vertical direction to split the prediction unit
into a first partition having a size of 16×64 and a second partition having 48×64, or
into a first partition having a size of 48×64 and a second partition having a size of 16×64.

4. The method of claim 1, wherein the vertically and horizontally directional corresponding internal boundary prediction pixel values include:
a pixel value of a first pixel which is located on a lowermost boundary of the current prediction unit and on a same vertical column as the internal pixel, and
a pixel value of a second pixel which is located on a rightmost boundary of the current prediction unit and on a same horizontal row as the internal pixel.

5. An apparatus for decoding an image, the apparatus comprising:
an inverse-transform unit configured to reconstruct a residue by entropy-decoding a received bit stream and by performing inverse quantization and inverse transform on the residue;
an intra predicting unit configured to generate a prediction unit by performing intra-prediction that selectively uses one of a plurality of prediction modes; and
an adder configured to reconstruct the image by adding the residue to the prediction unit,
wherein when a planar intra prediction mode is activated, a predicted pixel value of an internal pixel of a current prediction unit is obtained by performing bilinear interpolation using (i) vertically and horizontally directional corresponding pixel values in previously decoded left side block and upper end block of the current prediction unit and (ii) vertically and horizontally directional corresponding internal boundary prediction pixel values in the current prediction unit, wherein the vertically and horizontally directional corresponding pixel values in the previously decoded left side block and upper end block of the current prediction unit include:
a pixel value of a third pixel which is located on a lowermost boundary of the upper end block of the current prediction unit and on the same vertical column as the internal pixel, and
a pixel value of a fourth pixel which is located on a rightmost boundary of the left side block of the current prediction unit and on the same horizontal row as the internal pixel.

6. The apparatus of claim 5,
wherein the vertically and horizontally directional corresponding internal boundary prediction pixel values include:
a pixel value of a first pixel which is located on a lowermost boundary of the current prediction unit and on a same vertical column as the internal pixel, and
a pixel value of a second pixel which is located on a rightmost boundary of the current prediction unit and on a same horizontal row as the internal pixel.

\* \* \* \* \*